Aug. 23, 1949.　　　　H. M. REEVES　　　　2,480,046
COOKING TOP

Filed Aug. 22, 1945　　　　　　　　　　2 Sheets-Sheet 1

INVENTOR
Herbert M. Reeves
ATTORNEYS

Aug. 23, 1949.  H. M. REEVES  2,480,046
COOKING TOP
Filed Aug. 22, 1945  2 Sheets-Sheet 2
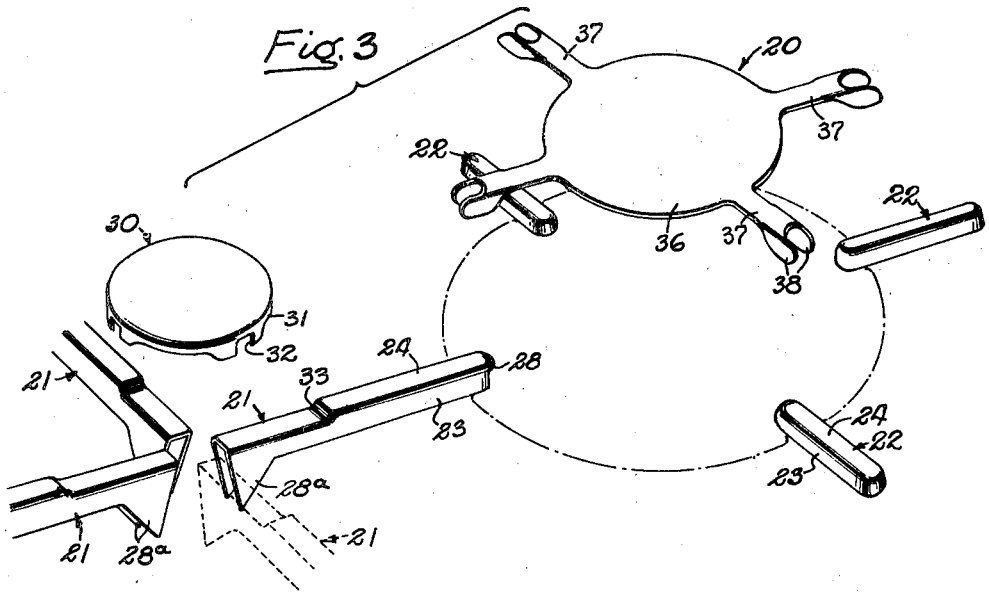
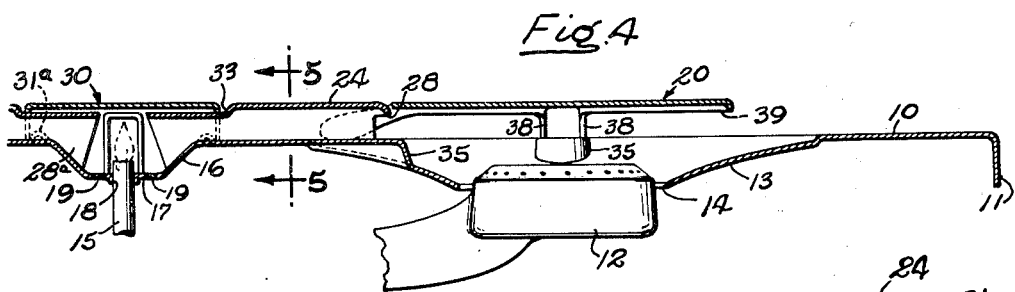
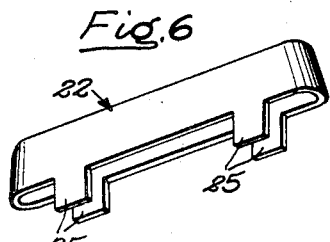
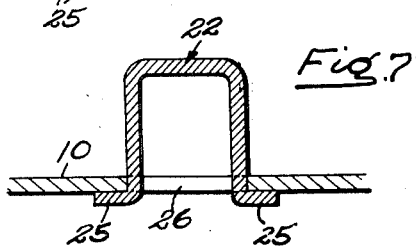
INVENTOR
Herbert M. Reeves
By Carlson, Pilgrim, Hubbard & Wolf
ATTORNEYS Patented Aug. 23, 1949

2,480,046

UNITED STATES PATENT OFFICE 2,480,046

COOKING TOP

Herbert M. Reeves, Kankakee, Ill., assignor to Florence Stove Company, Gardner, Mass., a corporation of Massachusetts Application August 22, 1945, Serial No. 611,946

10 Claims. (Cl. 158—115)

The invention relates to cookstoves or ranges generally and more particularly to an improved cooking top structure for such ranges.

One object of the invention is to provide a cooking top structure which is easier to keep clean, lighter in weight, more efficient in operation and less expensive to manufacture than conventional top structures.

A more specific object is to provide an improved top structure wherein the top plate and utensil supporting means may be constructed entirely of sheet metal.

Another object is to provide a top structure including a flat sheet metal top plate adapted to completely cover the burner box of the range and having utensil supporting elements in the form of sheet metal stampings permanently secured to the upper face of the top plate so as to provide combustion clearance between the utensils and the top plate.

Another object is to provide a cooking top structure having a plurality of hollow or tubular ribs performing the dual function of utensil supports and lighter tubes.

A further object is to provide a cooking top of the character set forth having removable grates disposed centrally of the utensil supporting elements for supporting cooking utensils of small size without danger of tipping, which provides efficient transfer of heat from the burner to the utensil, and which effectually protects the burner against boil over.

Other objects and advantages of the invention will become apparent from the following detailed description of the preferred embodiment illustrated in the accompanying drawings in which:

Fig. 3 is an exploded view showing the relationship between the utensil supporting elements, the top and pilot burners, and the complemental grate member.

Fig. 4 is a sectional view taken substantially on the line 4—4 of Fig. 1.

Fig. 5 is a transverse sectional view through one of the utensil supporting elements take in a vertical plane substantially on the line 5—5 of Fig. 4.

Fig. 6 is a perspective view of a modified form of utensil supporting element.

Fig. 7 is a transverse sectional view showing the manner in which the supporting element of Fig. 6 is assembled with the top plate of the grate structure.

Figure 1:
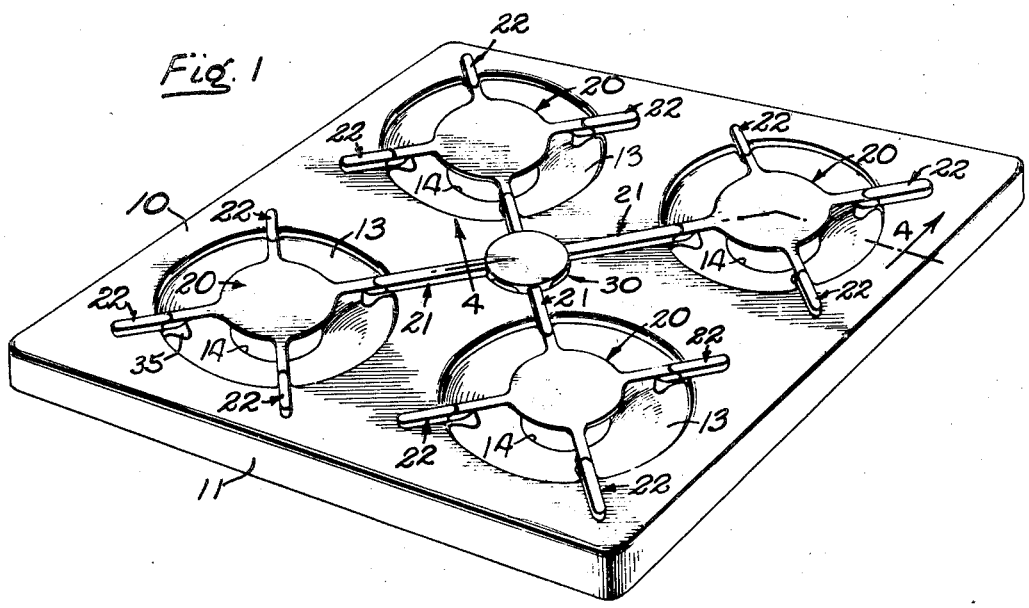
Figure 1 is a perspective view of a top structure embodying my invention.
Figure 2:
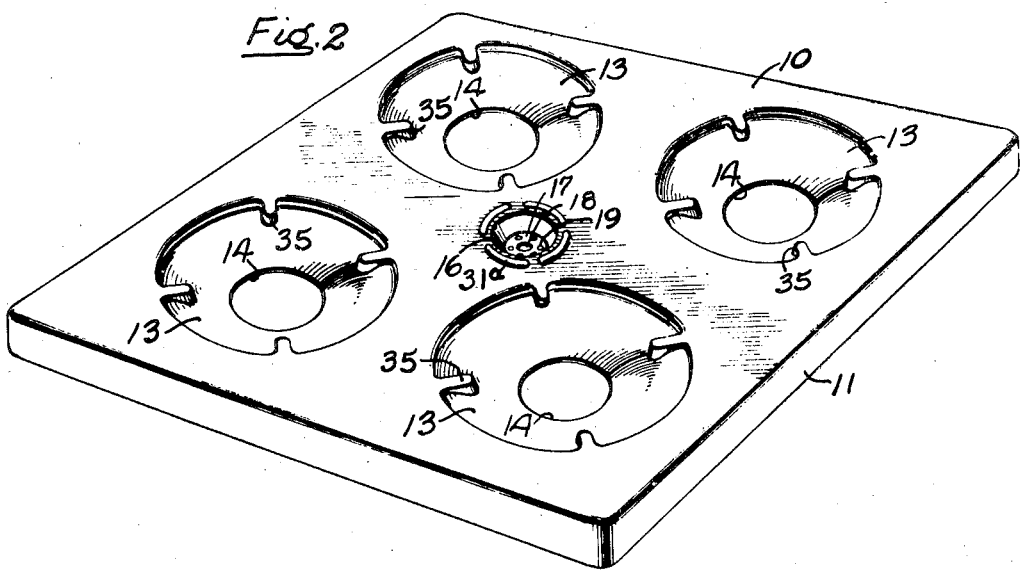
Fig. 2 is a perspective view of the top plate portion of the structure before securing the utensil supporting elements thereon.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to Fig. 1 of the drawings, the improved top structure comprises a flat sheet metal plate 10, herein shown as generally rectangular in form, adapted to overlie the burner box of a conventional cookstove or range. As shown, the plate is formed with the usual depending marginal flange 11.

For the accommodation of the top burners, such as the gas burner 12 shown in Fig. 4, the top plate is provided with a plurality of burner openings formed centrally of concave burner bowls 13. The bowls are preferably formed integral with the top plate and each has an opening 14 dimensioned to provide clearance around the burner 12 for the admission of secondary air thereto.

In accordance with the present invention the cooking top structure including the top plate itself, the utensil supporting means and the automatic lighter system, apart from the burners is adapted to be made entirely of sheet metal, thereby reducing substantially the cost of construction, decreasing the weight of the stove (which is very important from the standpoint of shipping costs), and in general improving the appearance and efficiency of the stove. In particular, the top structure comprises a top plate formed of sheet metal and having a group of burner openings each formed centrally of a burner bowl which is preferably formed integral with the top plate. In lieu of the usual cast iron grates the top plate is equipped with utensil supporting means comprising a plurality of hollow ribs formed of sheet metal and permanently secured to the upper face of the top plate in a manner such as to appear integral therewith. For coaction with these ribs each of the burner bowls is provided with an auxiliary removable grate member also of sheet metal and supported in overlying relation to the burners so as to coact with the burner bowls in the formation of mixing chambers. In addition to their utensil supporting function, certain of the hollow ribs may be utilized to form flash tubes for the automatic lighter system, the several grate members for the individual top burners being constructed and arranged to coact with such lighter tubes for the purpose of deflecting gaseous fuel issuing from the top burners through the tubes to a centrally disposed pilot light.

Referring now to the drawings, the top structure shown by way of illustration comprises a top plate 10 having a usual depending marginal flange 11 with four burner openings to receive top burners 12. The openings are formed centrally of concave burner bowls 13 which are preferably formed integral with the top plate. As shown, each of the bowls has a central opening 14 dimensioned to provide clearance around the burner for admission of secondary air thereto. A pilot burner 15 is positioned centrally of the top plate within a chamber formed in part by a small pilot burner bowl 16 having concave side walls terminating in a flat bottom wall 17, the latter having a central opening 18 for the reception of the pilot burner. A series of holes 19 in the bottom wall admit air to permit combustion. Supported in overlying relation to each of the burner bowls is a small sheet metal grate 20, and arranged in circumferentially spaced relation about each bowl and rigidly secured to the top plate are a plurality of hollow ribs 21 and 22, the former being somewhat elongated so as to extend inwardly from the respective bowls to the pilot burner bowl 16.

In the present instance the ribs or elements 21 and 22 are in the form of elongated hollow sheet metal shells or stampings of generally U-shaped cross section, each shell 22 having an elongated top wall portion 24 and a continuous peripheral edge portion defining opposed side and end walls 23 depending from the top wall portion. The shells are secured to the top plate in an inverted position so as to present side walls 23 substantially perpendicular to the surface of the top plate 10 and the top wall portions 24 thus defining relatively flat utensil supporting surfaces located in a common plane parallel to the surface of the top plate and spaced therefrom sufficiently to provide the necessary clearance under the bottom of a utensil resting thereon.

The elements 21 and 22 are first firmly secured to the top plate 10 with the bottom edges abutting the top surface of the plate and then the entire top surface coated with a heavy layer of vitreous enamel so as to conceal the joints between the elements and the top plate, thereby presenting an integral appearance. A preferred method of securing the elements in position is by welding their lower edges to the top face of the plate, as shown in Fig. 5. Alternatively, the elements may be formed with depending lugs 25 (Fig. 6) adapted to be inserted through suitable slots 26 in the top plate and bent back against the underside of the plate as shown in Fig. 6 to hold the parts rigidly in assembled relation. In either case, the top structure is finished with a coating 27 of vitreous enamel applied after assembly of the utensil supporting elements with the top plate. The enamel coating effectually fills the corners between the plate 10 and the walls 23 of the elements, producing rounded fillets 27a which enable the top structure to be cleaned easily.

As will be seen by reference to Figs. 3 and 6 of the drawings, the elements 22 are closed at opposite ends thus effectually preventing dirt or grease from collecting under the elements. The longer elements 21, however, are open at opposite ends and are extended into the pilot burner bowl 16 to provide fuel flow passages for flash back ignition of any of the burners 12 from the pilot burner 15.

The central grate members 20 overlying the burners 12 constitute deflector plates for directing gas issuing from the burners laterally into the flash tubes, the grates being preferably constructed to provide radial extensions for this purpose as will presently be described. The end of each element 21 adjacent its burner bowl may be formed with an overhanging lip 28 which additionally serves to deflect the gas discharged from the burner 12 into the passageway formed by the element. At the other end, the side walls of each element are extended downwardly as at 28a (Fig. 4) and tapered for tight fitting engagement with the inclined walls 16 of the pilot burner bowl, and the end of the element 21 preferably terminates close to the pilot burner 15.

To protect the pilot burner from air currents, the burner bowl 16 is covered by a cap member 30, herein shown as generally circular in form and having a depending marginal flange 31 adapted to rest on the top plate 10. Raised arcuate ribs 31a serve to hold the cap in centered relation to the pilot burner; and notches 32 are provided in the flange for the accommodation of the elements 21 which preferably have their outer ends offset downwardly as indicated at 33 to permit the cap to be located flush with the surfaces 24 of the supporting elements 21. As the cap member 30 is heated continuously by the pilot burner it may be used to advantage as a warming plate.

In the preferred form of top structure, the utensil supporting elements 21 and 22 are arranged to extend inwardly beyond the peripheral edges of the burner bowls 13. Support for the ends of the elements is provided by projections 35 formed in the top plate 10 extending radially into the respective bowls substantially flush with the top surface of the plate. The projections are of slightly greater width than the elements and additionally serve to support the grate member 20 above the burner bowl.

The grate member 20, in its preferred form, comprises a disk-like imperforate central portion 36 (Figs. 1 and 3) having a plurality of integrally formed arms 37 projecting radially therefrom. The arms 37 are spaced apart similarly to the spacing of the supporting elements 21 and 22 and are provided on their outer ends with depending side members 38 adapted to straddle the supporting elements and to engage the projections 35 to support the member 20. The side members are dimensioned so as to support the central portion 36 of the grate member substantially flush with the surfaces 24 of the supporting elements 21 and 22.

As will be seen by reference to Figs. 1 and 4 of the drawings, the central portion 36 of the grate member 20 is substantially smaller in diameter than the burner bowl 13 but larger than the burner opening in the bottom of the bowl. Thus the imperforate portion of the grate member extends over and effectually protects the burner 12 from boil over. Moreover, the smallest utensils are supported without danger of tipping. In addition to their utensil supporting functions, the grate members 20 form mixing chambers above the burners improving combustion under all conditions irrespective of the size of the utensil, also they facilitate ignition of the top burners without dependence on an overlying utensil by deflecting gas from the burners 12 through the passages provided by the elements 21, as above set forth. In this connection it will be observed that the extensions 37 of the grate members coact with the ends of the tube-forming ribs 21 to direct fuel gas issuing from the top burners to the pilot burner.

Preferably, the marginal edges of the central portion 36 of the member between the arms 37 are bent downwardly to form depending flanges 39 as best shown in Fig. 4. These flanges contribute to the efficient distribution of heat over the grate member. Also, it will be seen that the grate protects the bottom of the utensil from cool air rising centrally through the burner, and since the plate is heated to a high temperature, effectual conduction of heat to the utensil is insured.

It will be apparent from the foregoing that the invention provides a top burner structure of novel and advantageous construction. The provision of utensil supporting elements in the form of sheet metal stampings welded or otherwise rigidly secured to a top plate permits of a light weight low cost construction and yet one which is rugged and durable. Moreover, the use of the fixed utensil supporting elements as lighter tubes insures maintenance of proper relationship of the parts of the lighter system. Also it simplifies and reduces the cost of manufacture. Finally it is important to note that the location of the tubes in a plane substantially above the top burners contributes substantially to the flow of such gases to the pilot burner and thus insures positive and prompt ignition of the top burners.

I claim as my invention:

1. A cooking top structure for gas ranges comprising, in combination, a sheet metal top plate having a burner opening therein, utensil supporting elements arranged around said opening and projecting above the surface of said plate, a sheet metal heat transfer member having a central disk section and radially projecting arms, and downwardly turned outwardly projecting flanges at the ends of said arms adapted to straddle said supporting elements to aline the arms therewith, said flanges being operative to support said heat transfer member substantially centered above said burner opening.

2. A top structure for gas ranges comprising, in combination, a flat sheet metal plate having a burner bowl provided with a central opening for a top burner, utensil supports arranged around the periphery of said bowl and projecting above the surface of said plate, an auxiliary member cooperating with said supports including a flat sheet metal disk having radially projecting arms adapted to rest on said plate to support the member over said bowl with its top surface flush with the surfaces of the utensil supports, and depending flanges formed on said disk extending downwardly intermediate said arms.

3. A top structure for gas ranges comprising, in combination, a flat sheet metal plate having a top burner bowl, a pilot burner opening at one side of said burner bowl, an elongated hollow member rigidly secured to the top face of said plate, said member terminating at one end adjacent the pilot burner and opening at its other end into said bowl, and a deflector plate supported above said top burner bowl operative to deflect fuel flow through said member to the pilot burner whereby to effect flash back ignition to the top burner in said bowl.

4. A top structure for gas ranges comprising, in combination, a flat sheet metal plate, a top burner bowl in said plate, a pilot burner bowl in said plate at one side of said top burner bowl, a plurality of utensil supports rigidly secured to the upper face of said plate around said top burner bowl, one of said supports extending to and communicating with said pilot burner bowl to provide a fuel flow passage for flash back ignition to the top burner from the pilot burner.

5. A top structure for gas ranges comprising, in combination, a flat generally rectangular sheet metal top plate having a plurality of top burner bowls, a pilot burner bowl disposed substantially centrally of said top burner bowls, a group of hollow metal utensil supports secured to the face of said plate in radially disposed relation to each top burner bowl, one support of each said group extending from its associated top burner bowl to said pilot burner bowl and communicating therewith to provide for flash back ignition to the burners in the top burner bowls, and a cover for each top burner bowl for deflecting gaseous fuel to said pilot burner bowl.

6. A top structure for gas ranges comprising, in combination, a flat sheet metal plate having a plurality of burner openings, a pilot burner bowl depressed in said plate centrally of said top burner openings, means forming flash tubes between the top burner openings and said pilot burner bowl for flash back ignition to the burners in said openings, and a cover for said pilot burner bowl overlying the ends of said tubes, said cover having a marginal flange recessed to receive said tubes.

7. A top burner grate for gas ranges comprising, in combination, a flat sheet metal plate, a plurality of burner bowls formed in said plate, a pilot burner bowl formed in said plate between said top burner bowls, a group of utensil supporting elements secured to said plate adjacent each top burner bowl with their upper utensil engaging surfaces disposed in a common plane spaced above said top plate, one element of each of said groups being extended into said pilot burner bowl to form a fuel flow passage for flash back ignition of the burners in the top burner bowls, and a cover member supported above said pilot burner bowl and the adjacent ends of said passage forming elements, said elements having their end portions offset downwardly to permit said cover member to be located in the common plane with the utensil engaging surfaces of said elements.

8. A cooking top structure for gas ranges comprising a sheet metal top plate having a top burner opening and a pilot burner opening in spaced relation thereto and means for supporting a cooking utensil above the top burner opening in spaced relation to the top plate including a plurality of hollow sheet metal ribs permanently secured to the top plate in radiating relation to said burner opening, one of said ribs providing a flash lighter tube terminating at one end adjacent the top burner opening and at its other end adjacent the pilot burner opening.

9. A cooking top structure for gas ranges comprising, in combination, a top plate, a burner bowl carried by the top plate and having a burner opening, a cooking top burner positioned centrally of said opening, said top plate having a second opening spaced from the burner opening, a pilot burner in said second opening and means for supporting a cooking utensil in vertically spaced relation to the top plate and above the top burner including a plurality of hollow ribs radiating from the burner bowl and arranged in circumferentially spaced relation, one of said ribs terminating at one end adjacent the burner bowl and at its other end adjacent the pilot burner and providing a flash lighter tube, said utensil supporting means further including a plate overlying the burner and serving to deflect gaseous fuel discharged from the top burner through said tube.

10. A cooking top structure for cookstoves comprising, in combination, a flat sheet metal top plate having a plurality of burner openings, means rigid with said top plate for supporting cooking utensils over said openings in spaced relation to the top surface of said plate including a series of supporting elements disposed radially with respect to each burner opening, each of said supporting elements comprising a hollow sheet-metal shell having an elongated top wall portion and a continuous peripheral edge portion defining opposed side and end walls depending from said top wall portion, said elements being secured to said top plate with the edges of said side and end walls in bearing engagement with the plate, said plate and said elements having a coating of vitreous enamel providing a continuous surface free of cracks for convenient cleaning.

HERBERT M. REEVES.

REFERENCES CITED

The following references are of record in the file of this patent:

UNITED STATES PATENTS

| Number | Name | Date |
|---|---|---|
| 271,158 | Thomas | Jan. 23, 1883 |
| 616,521 | Birkicht | Dec. 27, 1898 |
| 874,637 | Struller | Dec. 24, 1907 |
| 1,442,074 | Kielberg | Jan. 16, 1923 |
| 1,490,557 | Brennan | Apr. 15, 1924 |
| 1,497,643 | Rutkowski | June 10, 1924 |
| 1,532,839 | Sherman | Apr. 7, 1925 |
| 1,572,168 | Smith | Feb. 9, 1926 |
| 1,663,438 | Brumbaugh | Mar. 20, 1928 |
| 1,820,277 | Klemme | Aug. 25, 1931 |
| 1,832,142 | Sherman | Nov. 17, 1931 |
| 1,957,442 | Brumbaugh et al. | May 8, 1934 |
| 1,959,657 | Chambers | May 22, 1934 |
| 1,996,397 | Baker | Apr. 2, 1935 |
| 2,005,242 | Rogers | June 18, 1935 |
| 2,059,534 | Pratt et al. | Nov. 3, 1936 |
| 2,081,819 | Kauffman | May 25, 1937 |
| 2,185,275 | Sherman | Jan. 2, 1940 |
| 2,232,482 | Schulz | Feb. 18, 1941 |
| 2,257,395 | Parker | Sept. 30, 1941 |